No. 750,766. PATENTED JAN. 26, 1904.
G. E. HIBBARD.
PACKING FOR SHAFTS.
APPLICATION FILED AUG. 27, 1900. RENEWED JUNE 23, 1903.
NO MODEL.
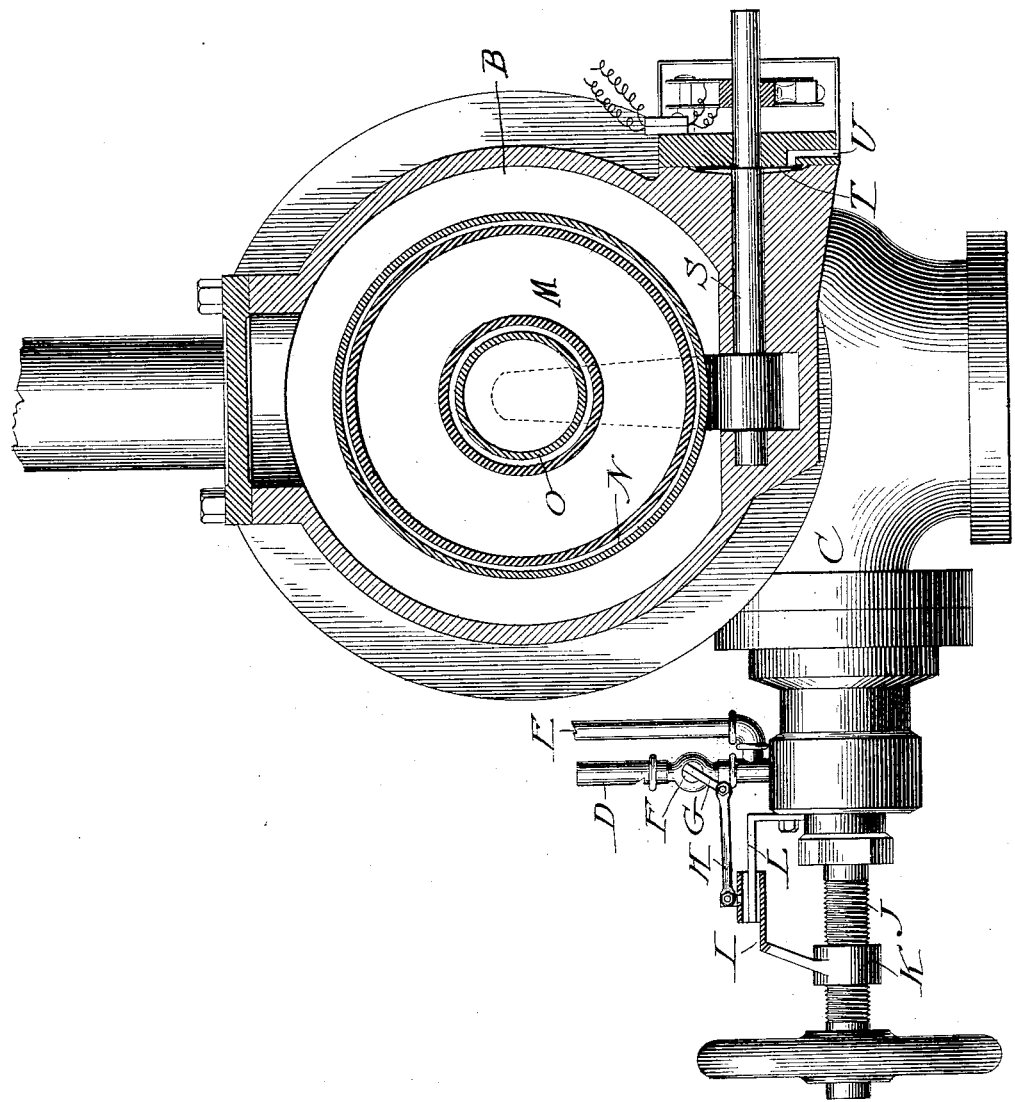
Witnesses: Inventor: George E. Hibbard No. 750,766. Patented January 26, 1904.

UNITED STATES PATENT OFFICE.

GEORGE E. HIBBARD, OF CHICAGO, ILLINOIS.

PACKING FOR SHAFTS.

SPECIFICATION forming part of Letters Patent No. 750,766, dated January 26, 1904.

Application filed August 27, 1900. Renewed June 23, 1903. Serial No. 162,780. (No model.)

*To all whom it may concern:*

Be it known that I, GEORGE E. HIBBARD, a citizen of the United States, residing at Chicago, in the county of Cook and State of Illinois, have invented certain new and useful Improvements in Packing for Shafts, of which the following is a specification.

The present invention relates to means for preventing water or other liquid from escaping from a chamber or other receptacle in which it is confined past a shaft which extends into said chamber or receptacle and passes out through an opening in the wall thereof and which is capable of turning about its axis, but incapable of any considerable endwise movement. In many mechanical organisms it is necessary or desirable to prevent leakage past a shaft, while at the same time leaving the shaft as free as possible in order that it may respond with certainty to a force put upon it and tending to turn it. This condition is found in valves for automatic fire-extinguishers, and to provide a suitable packing for the shafts of such valves is the principal object of the present invention. I have therefore illustrated the said invention in its application to the shaft of such a valve, but desire to have it understood that the invention is not limited to this application of it, but, on the contrary, it may be used on shafts of other organisms.

The invention consists in the features of novelty that are hereinafter described with reference to the accompanying drawing, which is made a part of this specification, and which is a vertical section of the main valve of an automatic fire-extinguisher with the improved packing applied to the shaft thereof.

M is the main valve, which is disposed in a chamber B of its casing and is fixedly secured to a shaft S, which passes through an opening in the side of the casing. The shaft is free to turn about its axis; but in its normal operation it does not have any endwise movement. In the construction shown in the drawing any considerable endwise movement of it would be prevented by the contact of that portion of the valve which is secured to the shaft with the sides of the recess which it occupies.

Leakage past the shaft S of the valve is prevented by a flexible annular disk or diaphragm T, preferably of metal, which is located in a chamber or recess, through which the shaft passes. The seat for the shaft upon opposite sides of the chamber is snug; but at the same time the shaft is sufficiently free to avoid any considerable frictional contact therewith, thus allowing it to respond freely to pressure that is transmitted to it from the main valve as the latter opens. The shaft has a shoulder which bears against the inner margin of the disk T, and preferably this inner margin of the disk is permanently secured to the shaft, so as to form at this point an absolutely water-tight joint. Where the disk is made of metal, this may be done by soldering. Preferably, also, the disk is provided with a shallow marginal flange, which bears against the outer wall of the chamber in which it is disposed, so as to leave a space between it and said outer wall, and the casing is provided with a passage U, communicating with this space for the purpose of draining it of any liquid that may escape past the disk. By this means the shaft is packed sufficiently tight for practical purposes without producing upon it any considerable friction that will interfere with its free operation, and at the same time provision is made for carrying off any small quantity of liquid that may escape past the packing-disk, thus preventing this liquid from passing through the shaft-opening in the outer wall of the chamber containing the packing-disk. As shown in the drawing, this opening extends into a chamber or housing containing parts of an alarm mechanism, and it is undesirable to allow any water to enter this chamber.

In the normal operation of this device the shaft turns about its axis; but it does not have any considerable endwise movement. It may have a limited endwise freedom in order that it will bear against the packing-disk and in turn force the packing-disk against the far side of the chamber in which it is contained, this freedom being sufficient to maintain a tight joint at the packing-disk and to compensate for wear. It has, however, a rotary movement as distinguished from an endwise-reciprocating movement in the normal operation of the valve, and it is this distinction which is intended to be drawn by the statement herein that the shaft is adapted to turn about its own axis and is prevented from moving endwise or by other statements of similar import.

Having thus described my invention, the following is what I claim as new therein and desire to secure by Letters Patent:

1. In a packing for shafts, the combination of a shaft adapted to turn about its axis, an opening to be packed against the flow of fluid, a shoulder carried by the shaft, a flexible packing-disk surrounding the shaft and coöperating with said shoulder, and means for preventing endwise movement of the shaft, substantially as described.

2. In a packing for shafts, the combination of a shaft adapted to turn about its axis, a chamber through which the shaft passes, means for preventing endwise movement of the shaft, an annular packing-disk surrounding the shaft and bearing at its outer margin upon the outer wall of the chamber in which it is contained, and a shoulder on the shaft engaging the inner margin of the disk, substantially as described.

3. In a packing for shafts, the combination of a shaft adapted to turn about its axis, a chamber through which it passes, means for preventing the endwise movement of the shaft, a packing-disk bearing at its outer margin upon the outer wall of the chamber in which it is contained, means for preventing the disk from moving longitudinally relatively to the shaft, and a drain-passage communicating with said chamber on the outer side of the disk, substantially as described.

4. In a packing for shafts, the combination of a shaft, a bearing in which it fits, a chamber through which it passes, a flexible diaphragm or disk having its inner margin secured to the shaft and bearing at its outer margin upon the outer wall of the chamber in which it is contained, substantially as described.

5. In a packing for shafts, the combination of a shaft, a bearing in which it fits, a chamber through which it passes and a flexible disk or diaphragm in the form of a ring having its inner margin secured to the shaft and having a marginal flange bearing against the outer wall of the chamber in which it is contained, the chamber being provided with a drain-passage leading from the outer face of the disk, substantially as described.

6. The combination with two chambers having openings in their walls and a shaft occupying said openings, of an annular packing-disk surrounding and borne upon by the shaft, a chamber in which said packing-disk is arranged so that it bears against one side thereof, and a drain-passage communicating with said chamber at the side thereof against which the disk bears, substantially as described.

GEORGE E. HIBBARD.

Witnesses:
WILLIAM E. HIBBARD,
L. M. HOPKINS.